March 27, 1951 — C. C. S. LE CLAIR — 2,546,671
LUBRICANT FITTING
Filed April 14, 1947 — 4 Sheets-Sheet 1
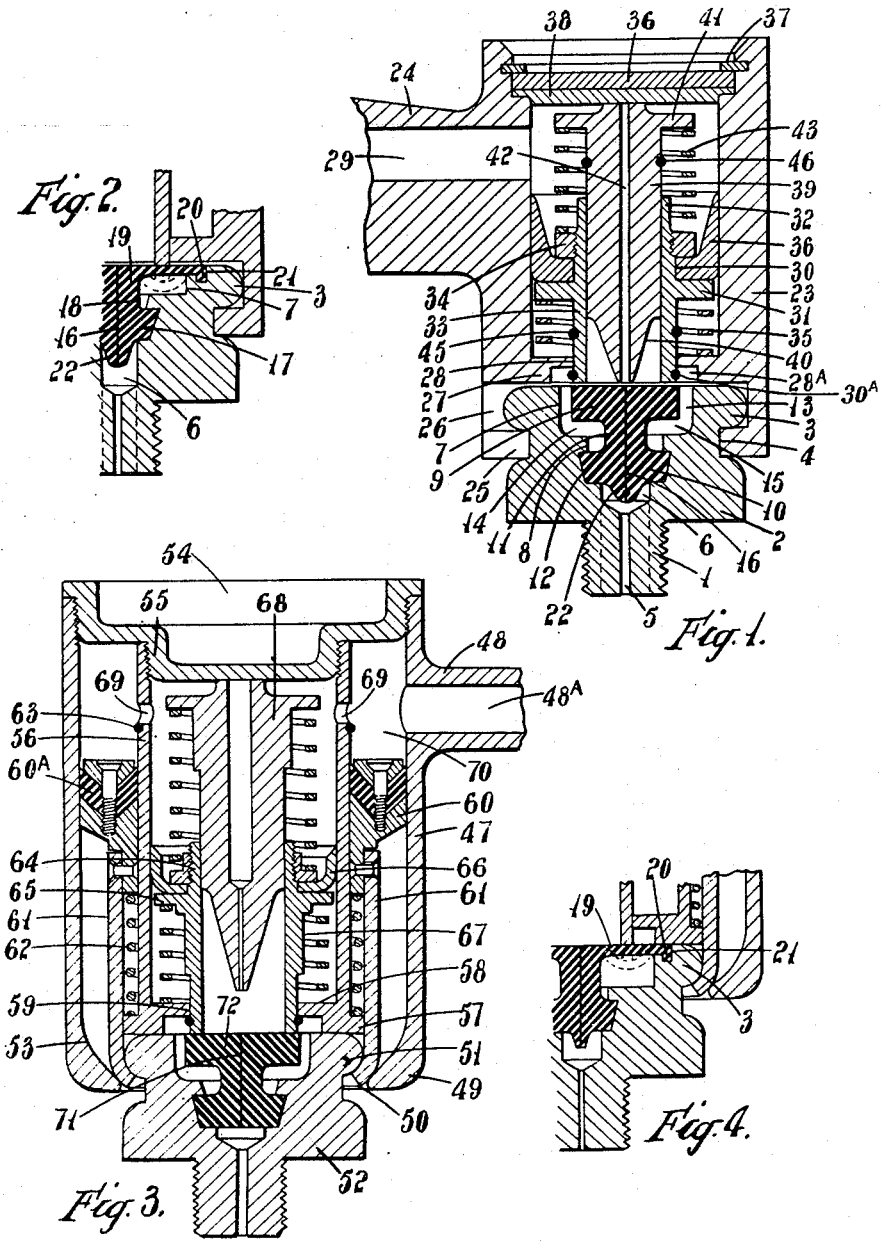

March 27, 1951  C. C. S. LE CLAIR  2,546,671
LUBRICANT FITTING

Filed April 14, 1947  4 Sheets-Sheet 2

Inventor:
Camille Clare Sprankling Le Clair
By Hinkle, Horton, Adelberg, Haumann + Wapper
Attorneys

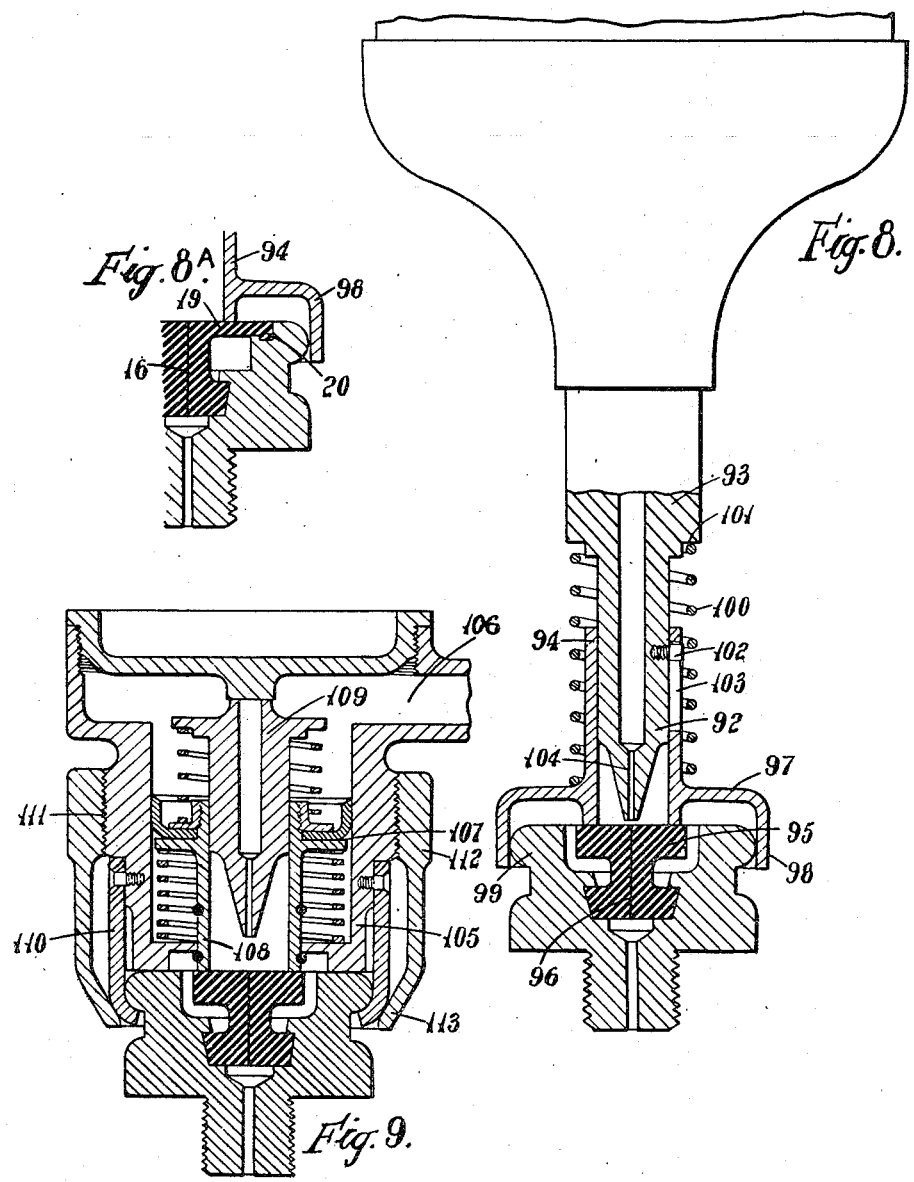

March 27, 1951  C. C. S. LE CLAIR  2,546,671
LUBRICANT FITTING
Filed April 14, 1947  4 Sheets-Sheet 4
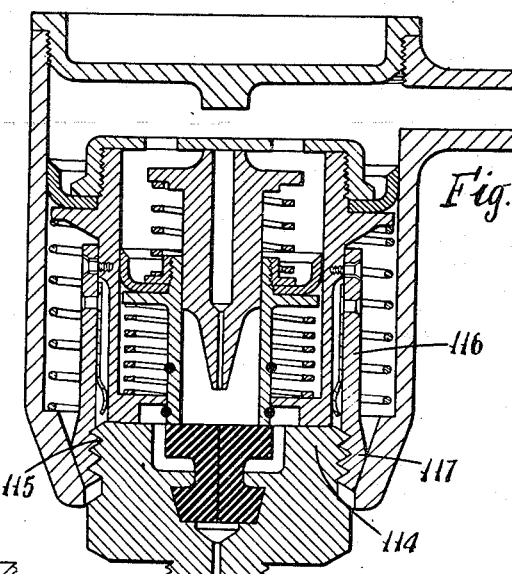
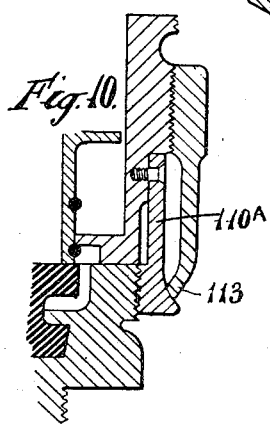
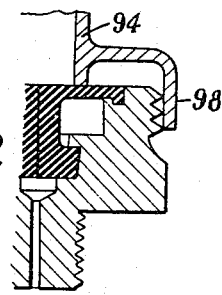
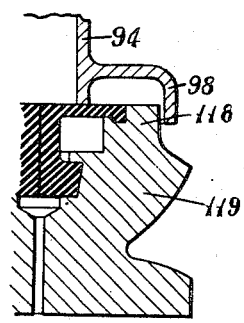
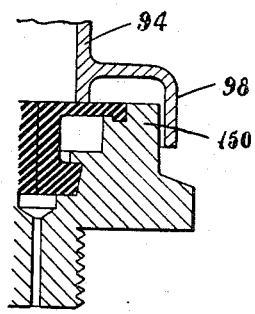

Patented Mar. 27, 1951

2,546,671

UNITED STATES PATENT OFFICE 2,546,671

LUBRICANT FITTING

Camille Clare Sprankling Le Clair, Acton, London, England, assignor to Tecalemit Limited, Brentford, England, a corporation of Great Britain Application April 14, 1947, Serial No. 741,361
In Great Britain April 26, 1946

13 Claims. (Cl. 184—105)

This invention relates in general to lubrication systems of the kind in which lubricant is discharged at high pressure by means of a grease gun or other high pressure lubricant-discharging device into a nipple or lubricant-receiving device which is usually attached permanently to the part to be lubricated. The invention also relates to lubrication systems in which a grease gun or equivalent is provided with, or is connected to, a nozzle which is provided with jaws or other device, whereby the nozzle may be detachably applied by direct thrust or detachably attached by "push-on," "pull-on" or "lateral" or other method of engagement to the nipple, which latter may be formed with a flange or head or other means adapted to be engaged by the jaws or other device of the nozzle body.

The invention thus relates, for example, to lubrication systems in which the nozzle is adapted to form a lubricant tight joint with the nipple by thrust applied to the nozzle, or in which the nozzle comprises a number of movable jaws which, when operated manually, mechanically, or by the pressure of the lubricant forced into the nozzle by the grease gun or equivalent, are adapted to form a detachable connection with the nipple, or in which the nozzle is provided with fixed jaws in the form of a channel adapted to form a detachable connection with a flange on the nipple.

Known types of nipple used in the above mentioned lubricant systems are frequently provided with non-return valves adapted to close the lubricant passages, but whether they are provided with non-return valves or not the open-ended inlets of the said passages form lodgements in which dirt can collect.

One object of the present invention is to provide nipples or lubricant receiving devices (hereinafter called "nipples") which are so constructed that dirt cannot collect in the said inlets.

According to the present invention, the inlet end of the lubricant passage in the nipple is provided with a closure member which is made of flexible or resilient lubricant-impervious material, and is formed with a passage of such small size that the lubricant passage is normally closed, and there is no exposed aperture or space in which dirt can collect. The closure member and the nipple body surrounding it are, however, so constructed that by pressure applied to the closure member around, and at a position spaced laterally from, the said passage in the closure member, the closure member may be so distorted or deflected that the inlet end of the passage in the member is opened or spread initially to allow the entry of a nozzle or injector device whereby lubricant under pressure imposed upon it by a grease gun or equivalent device may be delivered into the said passage in the closure member thence into the lubricant passage in the nipple and thence to the place of use.

The closure member thus not only acts to prevent the access of dirt to the lubricant passage in the nipple, but also, as will be explained hereinafter, acts as a non-return valve to prevent the back flow and escape of lubricant when the pressure of the latter is relieved, and the nozzle is removed.

The said lubricant passage in the closure member remains wholly closed until the above-mentioned pressure is applied to the closure member, to open the inlet end of the passage.

A further object of this invention is to provide the combination of a nipple, constructed as briefly described above and hereinafter, with a nozzle which may form part of, or may be attached directly or indirectly to, a grease gun or equivalent (hereinafter called "grease gun") and is provided with means which, by direct thrust or under the pressure of lubricant fed into the nozzle by the grease gun, is adapted to apply the requisite lateral force upon the said closure member around the inlet end of the said lubricant passage so as to open the inlet end, and with hollow conduit means which, also by direct thrust or under the pressure of the lubricant, is thrust into the opened inlet end of the passage, and thus allows the lubricant to be injected through the passage into the nipple, and thence to the place of use of the lubricant.

The said flexible or resilient closure member in the nipple may consist of a flexible, lubricant impervious teat having an inner flange which is fitted in a correspondingly-shaped recess formed within the nipple near the inlet end of the lubricant receiving passage in the nipple, an outer flange and a "waist" or part of reduced diameter which connects the two flanges, the outer flange and the waist above the inner flange being surrounded by an annular space formed by an enlargement of the lubricant passage in the nipple. The teat is provided with a straight-through passage which is formed by merely piercing the teat without removing material. The outer surface of the outer flange of the teat is usually flush with the outer surface of the nipple.

In a modification, the inner flange of the teat is integral with an inwardly projecting tapered shank, which may be formed into two or more flexible lips divided by a longitudinal slit, or slits, which communicate with the passage.

In a further modification, the outer flange of the teat is relatively thin and closes the outer end of the said annular space in the nipple, being provided with means for anchoring the peripheral part of the flange to the nipple.

Various constructional forms of the nipple, and also of nozzles, adapted to be used in association therewith will now be described, by way of example, with reference to the accompanying drawings, and in these descriptions it will be assumed that the nipple and nozzle are both arranged in a vertical position, with the nozzle uppermost delivering downwards to the nipple. On the drawings:

Figure 1 is a sectional view of a nozzle and nipple combination, the nozzle being engaged in its working position on the flanged head of a nipple. In this figure, the nozzle is of the type which comprises fixed jaws for engagement upon and around the flanged head of the nipple by "pull-on" motion and in which the hollow slidable conduit which engages in the lubricant passage in the teat is in the form of a nozzle or injector device and is slidable in a grease-operated piston assembly which is slidable in the nozzle body;

Figure 2 is a fragmentary sectional view showing the application of a nozzle as shown in Figure 1 to a modified form of nipple in which the outer flange of the teat is provided with a peripheral rim which is fixed in an annular recess formed in the outer face of the nipple;

Figure 3 is a sectional view of another nozzle and nipple combination, the nozzle being engaged in its working position on the head of the nipple. In this figure, the nozzle comprises an outer piston assembly which is slidable upon a fixed inner body part of the nozzle within the outer body part of the nozzle and which also carries nipple-engaging jaws adapted to engage the circular head or flange of a nipple of the type shown in Figure 1;

Figure 4 is a fragmentary sectional view illustrating the application of a nozzle as shown in Figure 3 to a nipple as shown in Figure 2;

Figure 5 is a sectional view of a further nozzle and nipple combination, the nozzle being engaged in its working position on the head of the nipple. In this figure, the inner piston assembly and the nozzle or injector device are slidable in an inner body part which is slidable within the outer body of the nozzle and carries nipple-engaging jaws adapted to engage the circular head or flange of a nipple of the type shown in Figure 1;

Figure 5:
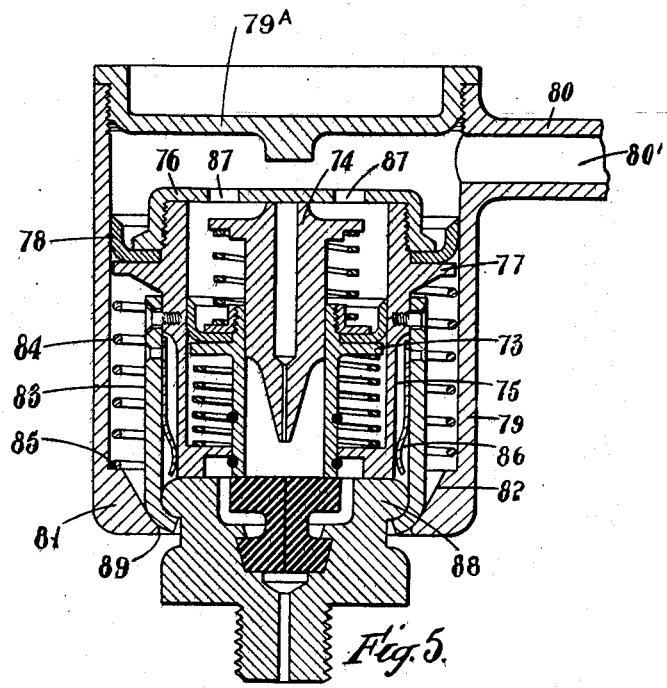

Figure 8 is a sectional view of a further nozzle and nipple combination. The nozzle shown in this figure is not adapted to be attached or gripped to the nipple and part of the head of the latter is shaped to provide a guide for a spring-urged sleeve which is slidable upon the nozzle body and is adapted to ensure that the pointed end of the nozzle is in correct alignment with the lubricant passage in the nipple teat;

Figure 8A is a fragmentary sectional view showing the application of a nozzle as shown in Figure 8 to a nipple as shown in Figure 2;

Figure 9 is a sectional view of a nozzle and nipple combination in which the nozzle is provided with manually-operated nipple engaging jaws;

Figure 10 is a fragmentary sectional view of a modification of the nozzle and nipple combination shown in Figure 9, the nipple-engaging jaws being formed with projections adapted to engage in annular grooves or serrations formed in the head of the nipple;

Figure 11 is a sectional view of another nozzle and nipple combination in which the nozzle is of the type shown in Figure 5 but differs therefrom in that its nipple-engaging jaws are formed with projections adapted to engage in annular grooves or serrations formed in the head of the nipple; and Figure 12 to 14 are fragmentary sectional views showing the application of a nozzle as shown in Figure 8 to modified forms of nipple all having teats of the kind shown in Figure 2.

Referring to Figure 1:

In this constructional form of the invention the nipple comprises a shank 1, which is screwed or otherwise formed for attachment to a place of use of the lubricant, an enlarged intermediate or spanner-engaging part 2, and a circular flange 3 which is separated from the intermediate or spanner-engaging part by an annular recess which thus provides a neck 4 between the latter and the flange around which the jaws of the nozzle may be engaged, as described hereinafter.

The nipple is provided with an axial grease outlet passage 5 which extends from the bottom end of the screwed shank to a position spaced slightly above the lower flat face of the spanner-engaging part 2 of the nipple where it joins a coaxial enlarged bore 6, which at its upper or inlet end is opened out in the form of a recess having two different diameters 7 and 8, shaped to receive the teat.

The flexible, lubricant impervious teat may be formed with two flanges 9 and 10 joined by a narrower part or waist 11. The lower flange 10 is usually of smaller diameter than the upper flange 9, and is housed in a groove 12 cut in the smaller diameter part 8 of the recess. The upper flange 9 is housed in the larger diameter part 7 of the recess, its upper face being flush with the upper surface of the nipple, and a radial clearance 13 is allowed between the edge of the flange and the surrounding wall of the recess. An axial clearance 14 is also allowed between the back of the flange and the bottom of the recess and, further, a radial clearance 15 is also allowed between the waist 11 of the teat and the metal surrounding it. The teat is provided with a straight-through axial lubricant inlet passage 16 formed by merely piercing the teat without removing material.

Owing to the flexibility of the material of which the teat is made, the lower flange 10 can be readily inserted into the groove 12, although some distortion of the rubber is necessary to permit of this. In a preferred embodiment to facilitate this insertion the lower flange of the teat may be made tapered as shown in Figure 1. In this case the groove 12 and the upper end of the smaller bore 8 may also, if desired, be made tapered. If made in this fashion a comparatively small vertical force will suffice to thrust the lower flange 10 into position.

Whilst having the advantage of simplicity, the particular construction described above has the disadvantage that it involves a clearance space 13, 14 and 15 between the upper flange 9 and the waist 11 of the teat and the surrounding metal of the nipple flange. This space may possibly fill with fine dirt which, although it cannot be induced into the lubricant stream, may make it difficult for the upper flange of the teat to be deflected, and the lubricant inlet passage 16 to be opened, in the manner desired.

Hence, in a second constructional form of the nipple shown in Figure 2, the teat is made of a slightly different profile. It will comprises a lower flange 17 and a waist 18, but the upper flange 19 is made thinner and of larger diameter, and around its peripheral edge a small circumferential downwardly-turned flange 20 is formed. This fits into a circular groove 21 cut into the nipple flange 3 between the outer edge of the latter and the above mentioned circular recess 7.

Thus, although a space is still left below the upper flange of the teat it is closed and cannot act as a dirt receptacle.

In either of the constructions shown in Figures 1 and 2, it is preferred that a tapered shank 22 be provided below the lower flange part 10 or 17 of the teat, projecting downwards into the lubricant passage 6 in the nipple. This tapered shank may or may not be split by a longitudinal cut, or cuts, into two or more lips. In either case, whether slit or not, owing to the tapered formation, any back flow of the grease will be stopped by the pressure of the grease, causing the tapered sides of the shank to collapse and the passage to close. The teat therefore acts as a nonreturn valve, and the inclusion of a ball and spring, or other conventional type of non-return valve in the nipple becomes unnecessary.

The nozzle for use in conjunction with either of the constructions of nipple described above comprises a sliding tubular piston device adapted under grease pressure to apply pressure to the upper flange 9 or 19 of the teat at a position surrounding the inlet passage 16 in the centre where the material is unsupported in such a manner that the upper flange is deflected downwards and the inlet end of the passage is drawn open to admit the entry of a lubricant nozzle or injector device incorporated in the nozzle.

Various constructional forms of the nozzle will now be described, their principal difference being in the form of the jaws used for effecting detachable attachment to the nipple.

Referring again to Figure 1:

In a first construction, the nozzle for use with the nipple comprises a hollow body 23 which is integral with, or attached to, a hollow shank 24, the latter being integral with, or adapted to be attached to, the grease oulet conduit of the grease gun (not shown). The bottom or nipple-engagng end of the nozzle is formed with a know form of recess of T-section, comprising a lower straight parallel portion 25 which extends from the side of the nozzle body nearest to the grease gun to the centre of the body where it connects with a semi-circular portion which is spaced from the opposite side of the nozzle body. In known manner, this arrangement provides two jaws between which the nipple neck 4 can be slidably engaged, and a channel 26 above the jaws adapted to receive the nipple flange 3.

The bore of the nozzle body 23 extends from the upper face of the body to a position short of the said channel, so that the body is provided with a base 27 separating the bore from the channel. A hole 28 is formed centrally in the base and provides communication between the bore, a recess 28A in the bottom of the base and the channel. The grease inlet conduit 29 in the hollow shank 24 of the hollow body communicates with the bore at a position near the upper face of the nozzle body.

An annular piston assembly is slidably arranged in the bore of the nozzle body and comprises a central metal body 30, having a flange 31 and tubular portions 32 and 33 which project above and below the flange. The flange of a flexible sealing ring 35 is held between the upper face of the flange 31 of the piston body and a nut 34 which is screwed upon a threaded part of the upper part 32 of the tubular portion of the piston body, the annular sealing lip of the ring being directed upwards. The piston assembly is constantly urged upwards by a coil spring 35, which reacts between the base 27 of the nozzle body and the underside of the flange 31 on the piston body.

The upper end of the bore of the nozzle body is closed by a cover plate 136 arranged in a recess in the nozzle body. The cover plate is held in position by a circlip 37, which is fitted in an annular groove formed in the nozzle body above the cover plate, and a flexible sealing ring or disc 38 is used below the cover to effect a pressure tight joint.

The lower part 33 of the tubular portion of the piston body 30 fits slidably in the hole 28 in the base 27 of the nozzle body but, except when the grease gun is in operation, it does not project beyond the lower face of the base, but it is either flush with it or is disposed slightly above it.

The sealing lip of the sealing washer 36 is so disposed that it can never mask the inlet end of the grease conduit 29 in the hollow shank 24 of the nozzle body. The external diameter of the bottom end of the tubular portion of the piston body is substantially equal to the diameter of the upper flange 9 of the flexible teat in the first construction of nipple shown in Figure 1, and substantially half the diameter of the flange 19 in the second construction shown in Figure 2.

A lubricant nozzle or injector device in the form of a plunger 39 is slidably arranged in the bore of the tubular portion 36 of the piston body, the bottom end of the plunger being pointed to form a needle or injector end 40. The plunger projects upwards out of the upper end of the tubular portion of the piston body, and slightly below its upper end the plunger is formed with an external flange 41. The upper and lower ends of the plunger are connected by a central straight-through bore 42. A coil spring 43, which reacts between the nut 34 screwed upon the upper part 32 of the tubular portion 30 of the piston body and the flange 41 on the plunger, normally holds the upper end of the plunger in contact with the sealing washer 38 in the nozzle body, which thus acts as a stop for the upward movement of the plunger. The annular piston is therefore carried in floating fashion between the upward reaction of its own spring 35 and the downward reaction of the plunger spring 43 and will move more freely under the influence of the grease pressure than the plunger 39 which is biased upwards only by one spring.

Alternatively, a circlip 36A fitted around the lower part 33 of the tubular portion 30 of the piston body may be used to limit the upward movement of the piston, the bottom face of the nozzle body being recessed at 28A, as mentioned above, to accommodate it.

In operation, the nipple-engaging jaws 25 of the nozzle body are first hooked upon the neck 4 of the nipple, and the nipple flange 3 is engaged in the channel 26 in the nozzle body, the bottom face 27 of the base of the body then engaging the upper face of the nipple flange. The nozzle is then pulled across the nipple in known fashion until the nipple flange 3 is fully engaged in the semi-circular end of the channel 26 in the nozzle body. In this position, the axis of the plunger 39 and the axial passage 16 in the flexible teat are in exact alignment.

When the grease gun is operated, grease under pressure is forced through the conduit 29 in the hollow shank 24 of the nozzle body into the bore of the latter, exerting a downward thrust on both the plunger 39 and the piston assembly, but, as explained previously, the piston assembly, being held floatingly and more freely than the plunger, will move first, thrusting the lower end 33 of the tubular portion downwards on to the upper flange 9 of the flexible teat. As this upper flange is supported at the middle by the waist 11 of the teat and is loaded at its edge where it is unsupported by the bottom end of the tubular portion, the edge part of the upper flange flexes downwards and the inlet end of the lubricant passage 16 in the teat is pulled radially outwards to receive the pointed stem 40 of the plunger.

If a teat of the second construction shown in Figure 2, is used, its upper flange 19 is supported at the centre by the waist 18, as in the first construction, and is also supported at the flanged edge 20. The bottom end 33 of the tubular piston 30 applies pressure about mid-way between these supports, and by a sort of toggle action, see the broken lines, places the flange in radial tension. As the outer edge of the flange 19 is locked in position by the flange 20 in its groove 21, and it cannot move inwards, the inner part of the flange 19 surrounding the central passage 16 will be pulled radially outwards, thus opening the inlet end of the passage in the teat, ready to receive the pointed end 40 of the plunger 39.

The downward motion of the piston assembly is limited either by a stop 45, for example, in the form of a circlip, or a shoulder on the lower end 33 of the tubular portion of the piston engaging the base 27 of the nozzle body, or by the underside of the flange 9 or 19 of the flexible teat contacting the bottom of the recess 7 in which, or over which, it is fitted. As soon as the downward motion of the piston assembly is arrested further operation of the grease gun will cause the pressure of the grease in the nozzle body bore to build up, and ultimately to force the plunger 39 downwards until its needle or injector end 40 is thrust into the opened inlet end of the lubricant passage 16 in the flexible teat.

The downward motion of the plunger is limited either by a stop 46, for example, in the form of a circlip, or a shoulder, on the upper part of the plunger, or the flange 41 against which the spring 43 reacts, contacting the upper end of the part 32 of the tubular portion of the piston body, or by pressure between the needle or injector end of the plunger and the material of the teat.

Still further operation of the grease gun will cause a charge of lubricant to be injected via the passage 42 in the plunger into the passage 16 in the teat, and thence into the lubricant outlet passage 5 in the nipple to a place of use.

When the operation of the grease gun is discontinued the plunger 39 is first thrust upwards into its original position by its coil spring 43, and the piston assembly then follows under the influence of its own spring coil 35 until the lower end part 33 of the tubular portion of the piston body is retracted into its original position in the hole 28 in the base 27 of the nozzle body. The nozzle can then be removed from the nipple.

It will be appreciated that in this construction the fixed nipple engaging jaws in the nozzle body may be arranged for "push-on" or for lateral attachment, instead of for "hook-on" or "pull-on" attachment as described above.

In a second constructional form of the nozzle the jaws for effecting detachable attachment with the nipple during the lubricant injecting operation are mounted upon a supplementary annular piston which slides in the nozzle body in such a manner that, under the influence of the pressure exerted upon the lubricant, the jaws advance and grip the nipple head, and when the pressure on the lubricant is relaxed they recede back into the body of the nozzle, all substantially as described hereinafter and in the United Kingdom Patent No. 430,827, accepted June 26, 1935.

Thus, referring to Figure 3, in this construction, the nozzle comprises an outer hollow body 47 which is integral with, or attached to, a hollow shank 48, the latter being integral with, or adapted to be attached to, the grease outlet conduit of the grease gun (not shown). The bottom or nipple engaging end of the body is formed with an inwardly turned flange 49 through the centre of which is an aperture 50 large enough for the head 51 of the nipple 52, of whatever profile it may be, to pass through. The upper, or inner, side of the flange 49 is bevelled internally at 53 to an angle of approximately 45°, for a reason to be explained later.

The top end of the hollow body is closed by means of a cover 54 which is screwed into the threaded upper end of the cylindrical bore of the body.

The cover 54 is provided with a threaded downwardly projecting central boss 55 on to which a cylindrical inner body or sleeve 56, machined inside and out, is screwed concentric with the outer body. The bottom end of the inner body is formed with an outwardly turned flange 57, and also an inwardly turned flange 58 having a central aperture 59.

In the space between the outer body 47 and the inner cylindrical body 56 is fitted an annular piston 60 provided with an annular sealing washer 60A and having freely depending jaws 61 loosely hung from it in such a manner that, while relative lateral movement of the jaws is possible, relative axial movement is prevented and positive downward movement is enforced when the annular piston moves downwards. Spring means (not shown) may be provided for spreading the jaws outwards to their widest capacity, but this is not essential. The annular piston 60 and its depending jaws 61 are spring-urged upwards away from the nipple engaging end by a coil spring 62 which reacts between the outwardly turned flange 57 and the underside of the annular piston, being situated between the inner body 56 and the jaws 61. The upward movement of the piston is limited by a stop 63, for example in the form of a circlip on the outer side of the inner body wall, and in this position the tips of the jaws are withdrawn approximately flush with the bottom end of the inner body.

Within the inner body is mounted an inner annular piston and plunger assembly, comprising a piston body 64 with flange 65, sealing ring 66 and tubular part 67, within which latter slides a pointed hollow plunger 68 which acts as a lubricant injector, all as described in connection with the first construction of nozzle shown in Figure 1. A hole, or holes, 69 formed through the inner body near to the cover 54 provide communication for the ingress and egress of lubricant from the outer annulus 70 between the inner and outer bodies of the nozzle.

In operation, the nozzle is applied to the nipple in such a manner that the head 51 of the nipple passes through the aperture 59 in the flanged lower end 49 of the outer body 47 and butts flush against the flanged lower end of the inner body 56.

When the grease gun is operated, grease under pressure is forced through the conduit 48A in the hollow shank 48 of the nozzle body into the annular space 70 between the outer body and the inner body, where it exerts a downward force upon the annular piston 60, which is thereby caused to move downwards, thrusting the jaws 61 before it. As the jaws move downwards they contact, and are thrust radially inwards by, the bevelled upper side 53 of the inwardly-turned flange 49 on the outer body. This inward movement causes them to grip the head 51 of the nipple and hold it in correct axial alignment with the nozzle.

The outer annular piston 60 having thus completed its movement, further operation of the grease gun causes grease to pass through the holes 69 in the inner body 56, and then, having built up an increased pressure, to operate first the inner annular piston 64, which thus moves downwards and opens the end of the inlet passage 71 of the teat 72, and then the plunger 68, which follows and injects a charge of grease into the said passage, all as previously described in connection with the first construction shown in Figure 1.

Figure 4 shows the application of a nozzle constructed as shown in Figure 3, to a nipple constructed as shown in Figure 2, and thus having a teat with an enlarged relatively thin upper flange 19 formed with a peripheral flange 20 which is fitted in a circular recess 21 in the top of the nipple flange 3.

In a third constructional form of the nozzle, the jaws are arranged for lateral movement only, in contra-distinction to the previous construction, where they were arranged for advancing and receding movement as well.

As shown in Figure 5, in this construction, the inner annular piston 73 and its grease injecting plunger 74 are slidably arranged within an inner body 75, as in the second construction, but the body, instead of being attached to a boss on the cover of the outer body and thus held in fixed relationship thereto, is, in this construction, fitted with its own separate cover 76, and with a flange-like piston 77 and sealing ring 78. The whole assembly of sleeve, cover and piston is made slidable within an outer body 79, which is integral with, or attached to, a hollow shank 80, which in turn is adapted to be attached to the grease outlet conduit of the grease gun (not shown) as in the previous described constructions.

The outer body 79 is closed at its upper end by a cover 79A and is formed at its lower end with an inwardly turning flange 81, having a bevelled upper face 82, as in the second construction, and the depending jaws 83, which in this construction are attached to the outer surface of the inner cylinder 75, engage this bevel and are forced inwards, as will be described hereinafter. The inner body and the piston with the depending jaws 83 are urged upwards by a coil spring 84 reacting between the piston flange 77 and a flat ledge 85 provided on the inwardly-turning flange 81 on the outer body, the spring in this case surrounding the jaws and being located between them and the outer body.

Leaf springs 86 between the jaws 83 and the inner body surface may be employed for the purpose of spreading the jaws to their widest capacity. A hole, or holes 87, drilled through the inner cover 76 provide communication for ingress and egress of grease from the outer body 79 to the inner cylinder 75. This cover, in fact, merely serves as a stop to limit the upward movement of the pointed plunger 74.

In operation, the nozzle is applied to the nipple in such a manner that the head 88 of the nipple passes through the aperture 89 of the flanged lower end 81 of the outer body and butts flush against the lower end of the inner cylinder, the jaws being spread outwards as described above.

When the grease gun is operated, grease under pressure is forced through the conduit 80A in the hollow shank 80 of the nozzle body into the outer cylinder 79 above the cover 76 and the flanged piston 73 of the inner body, where it exerts a force downwards upon the inner body and piston, and upwards upon the outer body and its cover 79A.

Since the inner body is already in contact with the top of the nipple head 88, it cannot, strictly speaking, move downwards, and therefore the outer body 79 will move upwards relative to the nipple, the inwardly turning flange 81 will engage the lower ends of the depending jaws 83 and force them to move radially inwards and grip the head of the nipple. This operation having been completed, further operation of the grease gun causes grease to pass through the hole, or holes, 87 in the inner cylinder cover 76 and, having built up an increased pressure, to operate first the inner annular piston 73 and then the plunger 74, as previously described.

Figure 6:
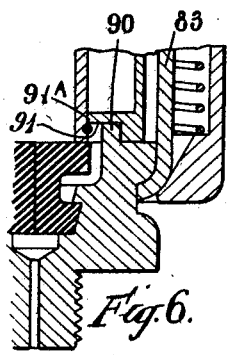
Figure 6 is a fragmentary sectional view showing the application of the nozzle shown in Figure 5 to a modified form of nipple.

Since both the second (Figure 3) and third constructions (Figure 5) depend for their successful operation on the concentric action of a set of movable jaws, it is possible, for the purpose of ensuring greater accuracy of alignment, to form the top of the nipple with a circular spigot 90, as shown in Figure 6, which registers in a recess 91 in the inner body of the nozzle, similar to the recess 28A in Figure 1, and formed to accommodate the circlip 91A on the piston tube.

Figure 7:
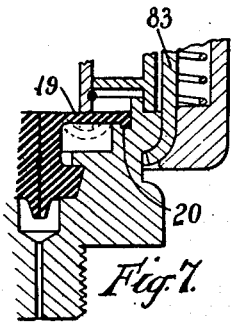
Figure 7 is a fragmentary sectional view illustrating the application of a nozzle as shown in Figure 5 to a nipple as shown in Figure 2.

Figure 7 shows the application of the nozzle of Figure 5 to a nipple having a teat constructed like that shown in Figure 2. It also shows how the spigot registration shown in Figure 6 can be applied to a construction where a teat constructed as shown in Figure 2 is used.

In a fourth constructional form the nozzle is adapted to be applied to the nipple by direct thrust only, and is accordingly not fitted with jaws at all.

In this construction as shown in Figure 8, the pointed plunger 92, which in previous constructions was slidable within an annular piston, is now made integral and coaxial with the grease gun outlet conduit 93 or to a fitting connected thereto and upon it is fitted a sliding sleeve 94, the lower end of which is adapted to engage the head 95 of the teat, spreading the rubber and opening the inlet passage 96, as previously described.

Near the bottom end the sliding sleeve 94 is fitted with a flange 97 having a downwardly turning rim 98 adapted to fit over the head 99 of the nipple and form a guide.

The sliding sleeve with its flange and guide rim is thrust downwards by a spring 100 which encircles the sleeve, and reacts between the flange and an abutment 101 on the outlet conduit of the grease gun or fitting.

A stop, which for convenience may be a pin 102 sliding in a slot 103, is provided to limit the outward motion of the sleeve under the influence of the spring.

In operation the nozzle is applied to the nipple by direct thrust, being held in a position substantially coaxial therewith. The rim 98 fits over the head 99 of the nipple and acts as a guide, locating the lower end of the tubular sleeve 94 and the teat in correct alignment.

A thrust on the grease gun or the said fitting first applies pressure to the head 95 of the teat, spreading the material and pulling the inlet end of the passage 96 open. This operation completed, the pointed end 104 of the plunger injector 92 is forced into the opened passage, the surrounding sleeve 94 sliding back against its spring.

On releasing the thrust on the grease gun or the said fitting the pointed end of the plunger is first withdrawn, the sleeve 94 again sliding forward and retaining contact with the head of the teat; then, finally, the sleeve and the head part company.

Figure 8A shows the application of the nozzle of Figure 8 to a nipple having a teat constructed like that shown in Figure 2, the operation of this construction being the same as the operation of the construction shown in Figure 8.

In a fifth construction of the nozzle shown in Figure 9 by way of example of the manual operation of the nozzle jaws, the nipple may be of either of the types mentioned above which are adapted to be gripped by movable jaws, and the nozzle may be of the same general type as the first described construction (Figure 1), the fixed T-sectioned jaws being deleted and replaced by jaws capable of lateral movement, as in the third constructional form of nozzle.

Thus, the nozzle comprises a cylinder body 105 with an inlet duct 106, and a hollow bore in which slides a piston assembly 107 of the type described in connection with the first construction (Figure 1), comprising a flange and a tubular part 108 in which slides a pointed plunger 109.

On the outside of the cylinder wall, at or near the nipple engaging end, are hung a number of jaws 110, while above the jaws the wall is formed with an external thread 111 upon which is screwed an internally threaded shell 112. The outside of the shell is knurled so that it can be gripped and rotated by hand, and the lower end is made conical at 113 to engage with the bevelled ends of the jaws, so that when the shell is screwed upwards on the thread the jaws are closed radially inwards.

In a modification, see Figure 10, the jaws 110A may be formed with a reversed bevel such that the jaws are closed inwards by a downward movement of the hollow shell.

As mentioned above in the descriptions of the various constructions of nozzles having jaws, when the operation of the grease gun is discontinued, the nozzle plunger and piston assembly return to their original positions under the influence of their coil springs. This return movement of the parts causes a back flow of grease out of the bore of the nozzle body back through the conduit in the hollow shank of the nozzle towards the grease gun. It is therefore necessary that the outlet conduit of the grease gun shall not have a non-return valve.

Different types of grease guns or other grease dispensers may be used. The grease gun may, for example, be of the known type in which the plunger overruns and closes an inlet port during its discharge stroke. As soon as the inlet port is overrun and closed further movement of the plunger discharges grease through the conduit in the hollow shank of the nozzle into the bore of the latter, the nozzle piston assembly then being operated as previously described, and some of the grease being discharged through the nipple to the place of use.

When the gun plunger makes its return stroke the grease column in the bore of the nozzle body and the said conduit will follow it until the nozzle plunger and piston parts reach their upper stops. Thereafter the gun plunger, continuing its return motion, will create a void in the gun barrel, which void, when the inlet port is again uncovered, will be equal in volume to the grease discharged. As soon as the inlet port is uncovered the gun will be recharged by the influx of new grease.

It will be appreciated that the invention is not limited to the constructional examples given here, but many modifications both to the nipple and the nozzle are possible, thus, for example;

It is not essential that the lower end of the outlet passage in the nipple should be of less diameter than the part of the passage in which the tapered shank of the teat is arranged, as described herein, but may be of the same diameter.

The nipple need not necessarily be formed with a flanged head as described, but as shown in Figure 11, the head 114 may alternatively be formed with a number of serrations or grooves 115, the jaws 116 of the nozzle being formed with projections 117 to engage therewith. As shown in Figure 12, in cases when a nozzle of the fourth construction is used these serrations will serve as a guide for the rim 98 of the sleeve 94 equally as well as a circular flange on the nipple head.

Referring to Figure 13, the nipple may be formed with an upper frustro-conical or cylindrical part 118 and a partly hemispherical lower part 119, as disclosed in United Kingdom Patent No. 430,827, accepted June 26, 1935. When used with the nozzle shown in Figure 8, the upper part engages in the rim 98 and when used with the nozzle shown in Figure 6 the upper part engages in the inner cylinder part of the nozzle, and the jaws grip the hemispherical part 19.

Again, for use with a nozzle of the fourth construction (Figure 8) the nipple may have a plain cylindrical body with no flange or serration at all, see Figure 14.

The hollow grease inlet shank of the nozzle in any of the constructions of nozzle may be arranged at any desired angle to the axis of the nozzle body. It may also be provided with one or more ball or hinged joints and may be connected to the grease gun by a discharge conduit having one or more such joints.

The pointed lower end of the nozzle plunger, which acts as an injector, may, if convenient, be made much finer and more needle-like than shown in the accompanying drawings, and further it may be made as a separate member attached to the plunger as by screwing.

The teat, the cover sealing ring or washer and the piston sealing rings in the nozzle body may all be made of rubber, synthetic rubber or any other mouldable, lubricant-impervious, flexible material.

It will be understood that the nipples and nozzles herein described may be used in systems for dispensing grease or thixotropic solids or oil.

I claim:

1. A nipple fitting comprising a body member having a shank for securing the fitting in a lubricant-receiving passageway in a part to be lubricated and a head, said body member having a variable diameter passageway extending therethrough including at least one portion of enlarged diameter inwardly of the outer end of the passageway, and an axially pierced deformable closure member in said passageway and including an inner end part proportioned to be received in the enlarged intermediate portion of the passageway for anchoring said closure member against axial movement, and an outer end part including a portion supported from said inner end part in spaced relation to the walls of the passageway adjacent the outer end thereof so that space is provided into which the outer end part of the closure member may expand when pressure is applied thereto in a direction to expand the pierced opening therein radially.

2. A nipple fitting comprising a body member having a shank for securing the fitting in a lubricant-receiving passageway in a part to be lubricated and a head, said body member having a variable diameter passageway extending therethrough defining at least one shoulder intermediate the ends of said passageway, said passageway having an outer end part presenting bottom and side walls, and a deformable closure member in said passageway including outer and inner end parts and a reduced intermediate part defining a shoulder intermediate the ends of the closure member cooperating with the shoulder in said passageway for anchoring said closure member against axial movement in the passageway, said intermediate part supporting the outer end part of the closure member in the outer end part of said passageway and in spaced relation to the bottom and side walls thereof.

3. A nipple fitting comprising a body member having a shank for securing the fitting in a lubricant-receiving passageway in a part to be lubricated and a head, said body member having a variable diameter passageway extending therethrough defining at least one shoulder intermediate the ends of said passageway, said passageway having an outer end part presenting bottom and side walls, a deformable axially pierced closure member in said passageway including outer and inner end parts and a reduced intermediate part defining a shoulder intermediate the ends of the closure member cooperating with the shoulder in said passageway for anchoring said closure member against axial movement in the passageway, said intermediate part supporting the outer end part of the closure member in the outer end part of said passageway and in spaced relation to the bottom and side walls thereof, and a tip on the inner end of said closure member sufficiently reduced in size so that the pressure exerted thereon by the lubricant in the passageway causes the portion of the axially pierced opening passing through said reduced part to be held closed and thus prevent backflow of lubricant through the closure member.

4. A nipple fitting comprising a body member having a variable diameter passageway extending therethrough including an enlarged outer end part and an enlarged inner chamber, and an axially pierced deformable closure member in said passageway including an outer end part of cross-sectional area less than the cross-sectional area of the outer end part of the passageway, an inner part dimensioned to be received in said inner chamber for anchoring said closure member against axial movement in the passageway and a part connecting said outer and inner parts and forming a support for holding the outer end part in spaced relation to the body member in the enlarged outer end part of said passageway.

5. A nipple fitting comprising a body member having a shank for securing the fitting in a lubricant-receiving passageway in a part to be lubricated and a head, said body member having a passageway extending therethrough, an axially pierced deformable closure member in said passageway, and cooperating flanges and shoulders on said closure member and passageway inwardly of the outer end thereof for anchoring the closure member against axial movement in the passageway, said closure member having an intermediate portion of less cross-sectional area than the outer end of said passageway and an outer end portion of larger diameter to close the outer end of said passageway when the closure member is anchored therein and form a contact surface adapted to be engaged by a dispensing nozzle.

6. A nipple fitting comprising a body member having a shank for securing the fitting in a lubricant-receiving passageway in a part to be lubricated and a head, said body member having a passageway extending therethrough, an axially pierced deformable closure member in said passageway, cooperating flanges and shoulders on said closure member and passageway inwardly of the outer end thereof for anchoring the closure member against axial movement in the passageway, said closure member having an intermediate portion of less cross-sectional area than the outer end of said passageway terminating in an outer end portion of larger cross-sectional area for closing the outer end of said passageway when the closure member is anchored therein to form a contact surface adapted to be engaged by a dispensing nozzle, and a tip on the inner end of said closure member sufficiently reduced in size so that the pressure exerted thereon by the lubricant in said passageway causes the portion of the axially pierced opening passing through said reduced portion to be held closed for preventing backflow of lubricant through the passageway.

7. A nipple fitting comprising a body member having a shank for securing the fitting in a lubricant-receiving passageway in a part to be lubricated and a head, said body member having a passageway extending therethrough, an axially pierced deformable closure member in said passageway, cooperating flanges and shoulders on said passageway and closure member for anchoring the latter against axial movement, said closure member including a central body portion of less cross-sectional area than the outer end of the passageway adapted to extend into the same and an enlarged outer end, and cooperating flanges and grooves on the enlarged end of said closure member and the head of said fitting adapted fixedly to secure the peripheral portions of the enlarged outer end part of the closure member to the head of said fitting, said enlarged outer end forming a contact surface adapted to be deformed into the space in said passageway around the central body portion when axially directed pressure is applied to the contact surface between said central body portion and the peripheral flange for deforming the opening in the closure member radially.

8. A nipple fitting comprising a body member having a shank for securing the fitting in a lubricant-receiving passageway in a part to be lubricated, and a head, said body member having a passageway extending therethrough, and an axially pierced deformable closure member in said passageway, said closure member and passageway having cooperating flanges and shoulders inwardly of the outer end thereof for anchoring said closure member against axial movement in the passageway, and outer end portions at least parts of which are of different diameters so that at least a portion of the outer end of said closure member is held in spaced relation to the outer portion of the passageway in said body member.

9. A nipple fitting comprising a body member having a shank for securing the fitting in a lubricant-receiving passageway in a part to be lubricated, and a head, said body member having a passageway extending therethrough, an axially pierced deformable closure member in said passageway, said closure member and passageway having cooperating flanges and shoulders inwardly of the outer end thereof for anchoring said closure member against axial movement in the passageway and outer end portions at least parts of which are of different diameters to provide space in the outer end portion of the passageway into which said closure member may be expanded when force is applied to the outer end of the closure member in a direction to enlarge the pierced opening radially, and a tip on the inner end of said closure member of sufficiently reduced size so that the pressure exerted thereon by the lubricant in the passageway causes the portion of the axially pierced opening passing through said reduced part to be held closed and thus prevents backflow of lubricant through the closure member.

10. A nipple fitting comprising a body member having a shank for securing the fitting in a lubricant-receiving passageway in a part to be lubricated, and a head, said body member having a variable diameter passageway extending therethrough defining at least one shoulder intermediate the ends of said passageway, and an axially pierced deformable closure member in said passageway including an intermediate part of reduced cross-sectional area defining a shoulder intermediate the ends of the closure member cooperating with the shoulder in said passageway for anchoring said closure member against axial movement, and an outer end part, said intermediate part supporting the outer end part substantially centrally thereof and extending into the outer end of said passageway in spaced relation to the walls thereof so that space is provided between the closure member and outer end of the passageway into which the outer end of the closure member may expand when pressure is applied thereto in an endwise direction on a portion of the outer end of the closure member between the periphery of the intermediate portion and the side wall of the outer end of said passageway.

11. A resilient bushing for closing a lubricant-receiving passageway in a lubricant-receiving fitting or the like, comprising a body member of resilient deformable material having a pierced opening extending only axially from end to end thereof of no appreciable diameter when the bushing is relaxed, said body member being otherwise impervious and including an inner end portion adapted to be snugly received in a complemental part of said passageway and to cooperate therewith for anchoring said bushing in the passageway, and an outer end portion having a flat outwardly facing side forming a contact surface, said two body portions being connected by a portion of reduced cross-sectional area to support the outer end portion in said passageway and to facilitate deformation of the outer end portion in a direction to enlarge the opening radially when axially directed pressure is applied to the contact surface radially of the opening.

12. A resilient bushing for closing a lubricant-receiving passageway in a lubricant-receiving fitting or the like, comprising a body member of resilient deformable material having a pierced opening extending only axially from end to end thereof of no appreciable diameter when the bushing is relaxed, said body member being otherwise impervious and including an intermediate portion of less diameter than the outer end of the passageway, and opposite end portions of enlarged size relative to said intermediate portion, the inner one of said body portions being adapted to be snugly received in a complementary enlargement in said passageway for anchoring said bushing in the passageway and the outer of said end portions having a flat outwardly facing side forming a relatively thin contact surface of relatively large area to close the outer end only of the passageway, said intermediate portion forming a central support for the outer end portion to cause the pierced opening to be enlarged radially when axially directed pressure is applied to the contact surface outwardly of the periphery of said intermediate portion.

13. A resilient closure member for closing a lubricant-receiving passageway comprising a body member of impervious deformable material having a pierced opening extending axially from end to end thereof of no appreciable diameter when the closure member is relaxed, said body member including an inner enlarged part adapted to be received in an enlarged part of said passageway and to cooperate therewith for anchoring said closure member in the passageway, and an outer flange having a flat outwardly facing side forming a contact surface, said enlarged part and flange being connected by a portion of reduced cross-sectional area forming a central support for the flange to facilitate deformation of the same in a direction to enlarge the pierced opening radially when pressure is applied to the contact surface radially of the openings, and a tip on the inwardly facing end of said closure member through which a portion of the pierced opening passes, said tip being of reduced size so that the portion of the opening passing through the same will be held closed by the pressure present in the passageway and thus prevent backflow of lubricant through the closure member.

CAMILLE CLARE SPRANKLING LE CLAIR.

REFERENCES CITED

The following references are of record in the file of this patent:

UNITED STATES PATENTS

| Number | Name | Date |
|---|---|---|
| 1,688,571 | Zerk | Oct. 23, 1928 |
| 1,859,382 | Cruze | May 24, 1932 |
| 2,047,132 | Williams | July 7, 1936 |
| 2,061,062 | Davis et al. | Nov. 17, 1936 |
| 2,116,004 | Tear | May 3, 1938 |
| 2,274,753 | Sundholm | Mar. 3, 1942 |

FOREIGN PATENTS

| Number | Country | Date |
|---|---|---|
| 526,949 | Great Britain | Sept. 30, 1940 |